US011211778B2

(12) United States Patent
Casillas Enriquez et al.

(10) Patent No.: US 11,211,778 B2
(45) Date of Patent: Dec. 28, 2021

(54) TELECOMMUNICATION SYSTEM COMPRISING A CABLE DISTRIBUTION ASSEMBLY

(71) Applicant: North American Interconnect L.L.C., Scottsdale, AZ (US)

(72) Inventors: Ivan Alejandro Casillas Enriquez, Hermosillo (MX); Kain Haamed Hali Abdala Mendez, Hermosillo (MX); Felix Eugenio Norzagaray Mora, Hermosillo (MX)

(73) Assignee: North American Interconnect L.L.C., Scottsdale, AZ (US)

( * ) Notice: Subject to any disclaimer, the term of this patent is extended or adjusted under 35 U.S.C. 154(b) by 0 days.

(21) Appl. No.: 16/894,598

(22) Filed: Jun. 5, 2020

(65) Prior Publication Data

US 2020/0389002 A1 Dec. 10, 2020

Related U.S. Application Data

(60) Provisional application No. 62/857,458, filed on Jun. 5, 2019.

(51) Int. Cl.
*H02G 3/00* (2006.01)
*H02G 3/08* (2006.01)
*H02G 15/06* (2006.01)
*H02B 1/46* (2006.01)

(52) U.S. Cl.
CPC ............... *H02G 3/081* (2013.01); *H02B 1/46* (2013.01); *H02G 3/086* (2013.01); *H02G 15/06* (2013.01)

(58) Field of Classification Search
CPC ........ H02G 3/081; H02G 3/086; H02G 15/06; H02B 1/46
See application file for complete search history.

(56) References Cited

U.S. PATENT DOCUMENTS

| | | | |
|---|---|---|---|
| 7,013,074 B2 * | 3/2006 | Battey | G02B 6/3897 385/135 |
| 9,535,226 B2 | 1/2017 | Simmons | |
| 9,888,524 B2 | 2/2018 | Khemakhem et al. | |
| 9,906,303 B2 | 2/2018 | Michaelis et al. | |
| 10,151,897 B2 | 12/2018 | Gronvall et al. | |
| 10,153,841 B2 | 12/2018 | Palanisamy et al. | |

(Continued)

*Primary Examiner* — Pete T Lee
(74) *Attorney, Agent, or Firm* — Howard & Howard Attorneys PLLC (57) ABSTRACT

A telecommunication system powers and distributes a signal within a telecommunication network. The system includes a cable distribution assembly includes a housing defining an interior. The housing includes a body and a cover configured to provide access to the interior. The cover includes at least two connectors. The cable distribution assembly includes a splitter coupled to the cover. At least two distribution cables each extend between a first end and a second end. Each of the first ends are coupled to the splitter. Each of the second ends of the distribution cables individually correspond to, and are connected to, the connectors. The splitter, the at least two distribution cables, and the at least two connectors are continuously coupled to the cover when mounted to and removed from the body. A trunk cable assembly includes a power cable connected to the splitter and communication cables connected to the connectors.

21 Claims, 11 Drawing Sheets

(56) References Cited

U.S. PATENT DOCUMENTS

| | | | |
|---|---|---|---|
| 10,164,389 B2 * | 12/2018 | Wang | G02B 6/46 |
| 10,393,976 B2 * | 8/2019 | Islam | G02B 6/4471 |
| 2004/0173368 A1 * | 9/2004 | Dickson | H01B 9/027 |
| | | | 174/394 |
| 2008/0082276 A1 * | 4/2008 | Rivers | G01R 22/063 |
| | | | 702/62 |
| 2010/0020475 A1 * | 1/2010 | Spitaels | H01R 13/6666 |
| | | | 361/656 |
| 2011/0230075 A1 * | 9/2011 | Van Beveren | H02G 3/081 |
| | | | 439/345 |
| 2013/0084050 A1 * | 4/2013 | Vastmans | H02G 15/076 |
| | | | 385/135 |
| 2013/0108227 A1 * | 5/2013 | Conner | G02B 6/4471 |
| | | | 385/101 |
| 2017/0063470 A1 | 3/2017 | Smith et al. | |
| 2018/0069385 A1 * | 3/2018 | Gause | H02G 3/086 |
| 2018/0164355 A1 | 6/2018 | Winkler et al. | |
| 2018/0198529 A1 | 7/2018 | Boxer et al. | |
| 2018/0248644 A1 | 8/2018 | Gronvall et al. | |

\* cited by examiner

TELECOMMUNICATION SYSTEM COMPRISING A CABLE DISTRIBUTION ASSEMBLY

RELATED APPLICATIONS

This application claims priority to and the benefit of U.S. Provisional Patent Application No. 62/857,458, filed on Jun. 5, 2019, the entire contents of which are hereby incorporated by reference.

TECHNICAL FIELD

The present invention relates to a telecommunication system a comprising a cable distribution assembly.

BACKGROUND

Telecommunication systems distribute signals within a telecommunication network. Such telecommunication networks commonly implement distributed radio systems with power amplifiers and radios mounted on towers to support the increased data capabilities of smartphones. Such networks utilize RF connections from a remote radio unit (RRU) to an antenna. The RRU is often fiber-fed with digital communication protocols. Furthermore, a power (electrical) line is often provided to each RRU. The RRU's are disposed high on the tower near the antennas. The telecommunication system often includes a trunk cable that extends up the tower and are coupled to a cable box. The cable box includes a housing having a plurality of connectors that are selectively coupled to the remote radio units, therefore connecting the remote radio units to the telecommunication network.

The cable box typically includes a removable cover that provides selective access to an interior of the housing through an opening. However, the connection of the trunk cable with the plurality of connectors is located within the interior. Technicians must reach into the housing through the opening to service the trunk cable and the connectors (and any components coupled therebetween), which can be cumbersome and increases the time required to perform the service work. Accordingly, there remains a need to provide an improved telecommunication system.

SUMMARY OF THE INVENTION AND ADVANTAGES

The subject invention provides for a telecommunication system for powering and distributing a signal within a telecommunication network. The telecommunication system includes a cable distribution assembly including a housing defining an interior. The housing includes a body defining an opening into the interior and a cover selectively mounted to the body and configured to provide access to the interior. The cover includes at least two connectors configured for selective coupling to telecommunication devices. The cable distribution assembly further includes a splitter coupled to the cover and at least two distribution cables each extending between a first end and a second end. Each of the first ends of the distribution cables are coupled to the splitter and each of the second ends of the distribution cables individually corresponding to, and are connected to, one of the at least two connectors. The splitter, the at least two distribution cables, and the at least two connectors are continuously coupled to the cover of the housing when mounted to and removed from the body of the housing.

The telecommunication system further includes a trunk cable assembly mounted to the opening and extending into the interior of the housing. The trunk cable assembly includes a plurality of power cables each extending to a terminal end. One of the power cables is connected to the splitter at the terminal end for providing electricity from the power cable to the connectors and further to the telecommunication devices selectively coupled to the connectors. The trunk cable assembly further includes a plurality of communication cables with at least two of the communication cables directly connected to each of the connectors.

The subject invention further provides for a cable distribution assembly for use with a trunk cable assembly that includes a plurality of power cables each extending to a terminal end and a plurality of communication cables. The cable distribution assembly includes a housing defining an interior. The housing includes a body defining an opening into the interior and a cover selectively mounted to the body and configured to provide access to the interior. The cover includes at least two connectors configured for selective coupling to telecommunication devices. The cable distribution assembly further includes a splitter coupled to the cover and at least two distribution cables each extending between a first end and a second end. Each of the first ends of the distribution cables are coupled to the splitter and each of the second ends of the distribution cables individually correspond to, and are connected to, one of the at least two connectors. The splitter, the at least two distribution cables, and the at least two connectors are continuously coupled to the cover of the housing when mounted to and removed from the body of the housing.

Accordingly, all components between the power cable and the connectors are coupled to the cover. Therefore, removal of the cover pulls all of the components out of the interior of the housing, which improves access to all of the components. Furthermore, because none of the components are coupled to the body, the cover and all components between the splitter and the connectors may be completely separated from the body of the housing when the power cable is disconnected from the splitter.

BRIEF DESCRIPTION OF THE DRAWINGS

Advantages of the subject invention will be readily appreciated as the same becomes better understood by reference to the following detailed description when considered in connection with the accompanying drawings.

DETAILED DESCRIPTION OF THE INVENTION

Figure 1:
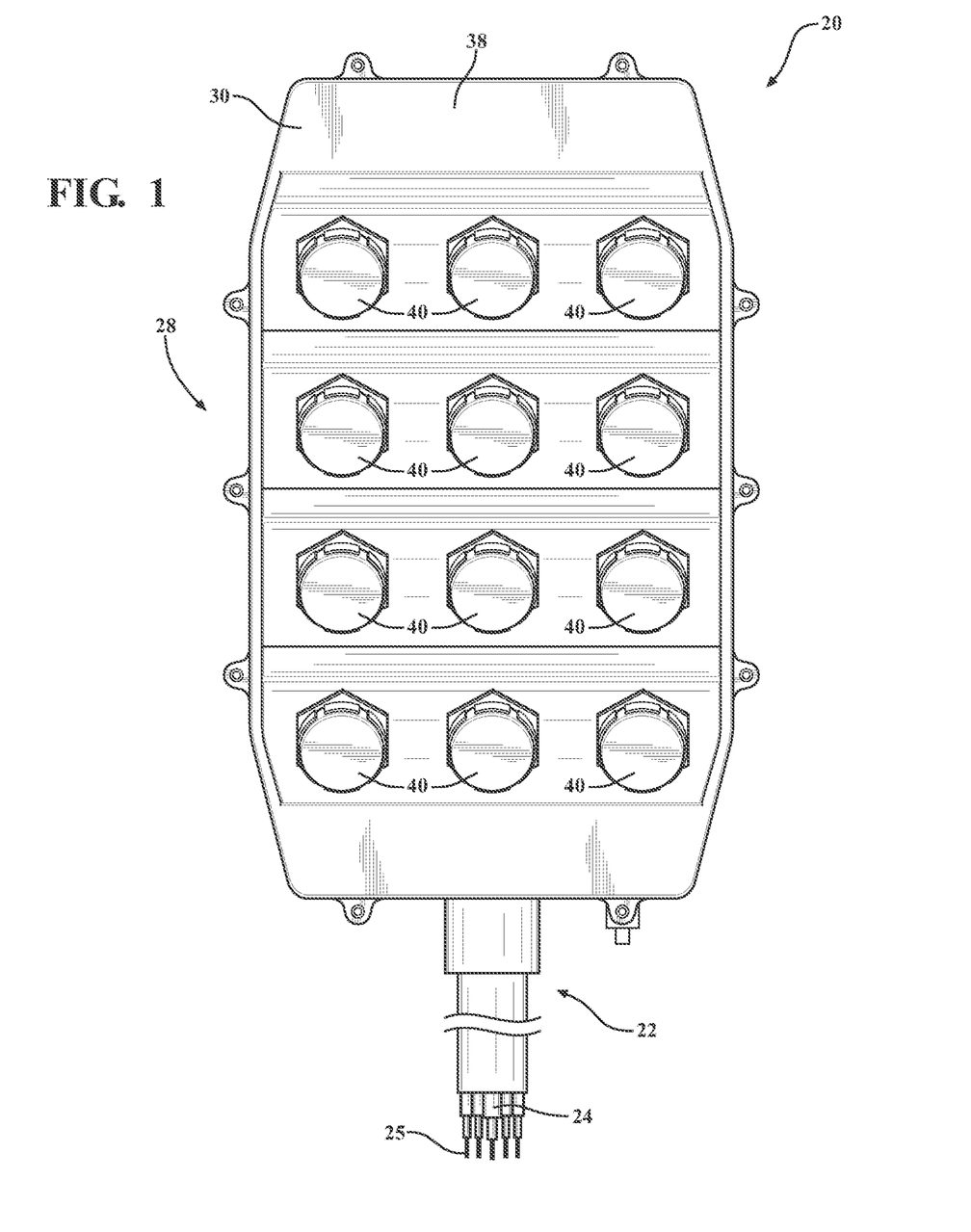
FIG. 1 is a front elevational view of a telecommunication system including a trunk cable assembly and a cable distribution assembly.

Referring to the Figures, wherein like numerals indicate like or corresponding parts throughout the several views, a telecommunication system 20 is generally shown in FIG. 1. The telecommunication system 20 powers and distributes a signal within a telecommunication network.

The telecommunication network may implement distributed radio systems with power amplifiers and radios mounted on towers to support the increased data capabilities of smartphones. This architecture is more power-efficient and permits more RF connections from a remote radio unit (RRU) to an antenna. As such, advanced antennas such as Multiple In-Multiple Out (MIMO) antennas may be utilized to gain the requisite signal-to-noise ratio required to support very high bandwidth LTE/4G mobile services. The RRU may be fiber-fed with digital communication protocols. Furthermore, a power (electrical) line may be provided to each RRU.

Figure 4:
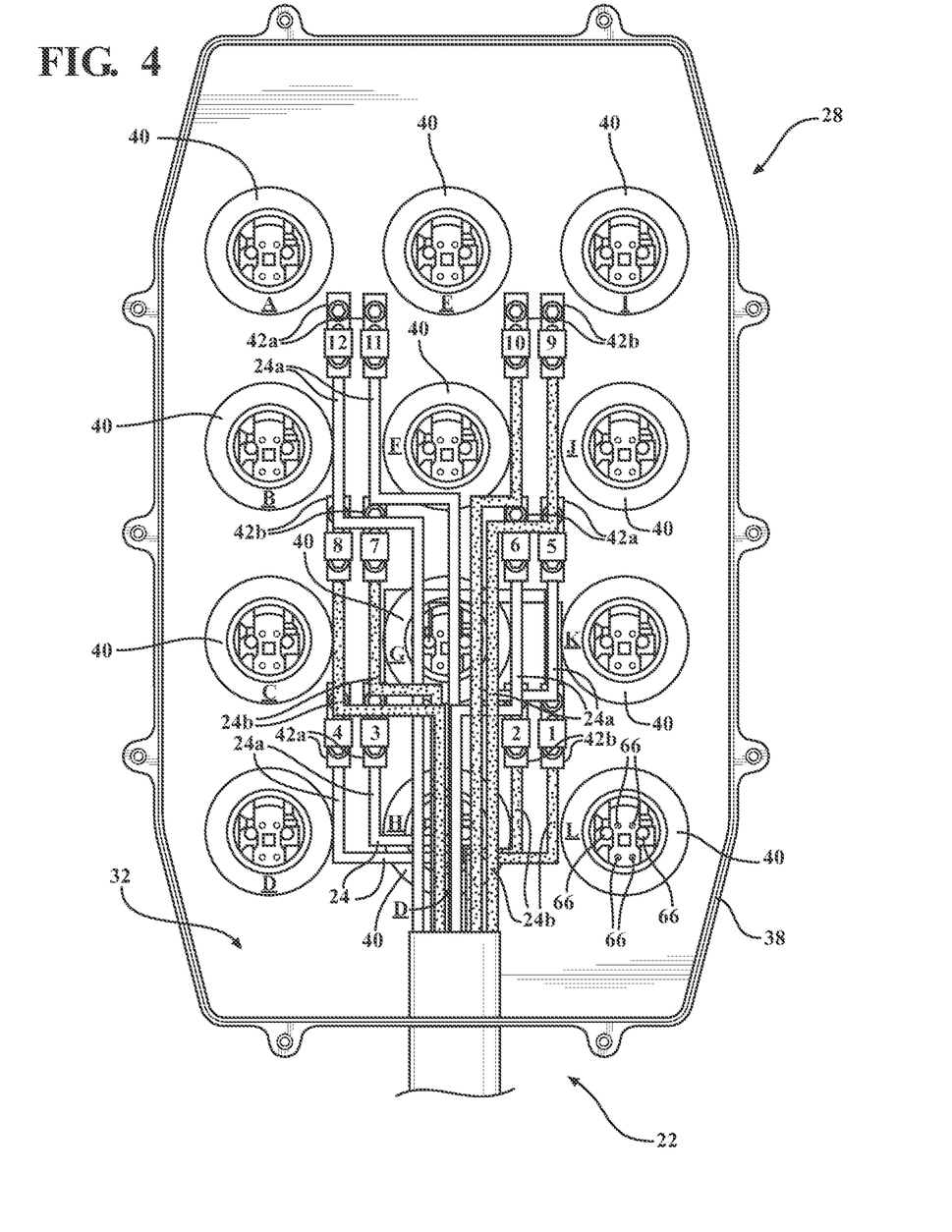
FIG. 4 is a schematic front plan view of the telecommunication system with the body removed and showing power cables coupled to splitters.
Figure 5A:
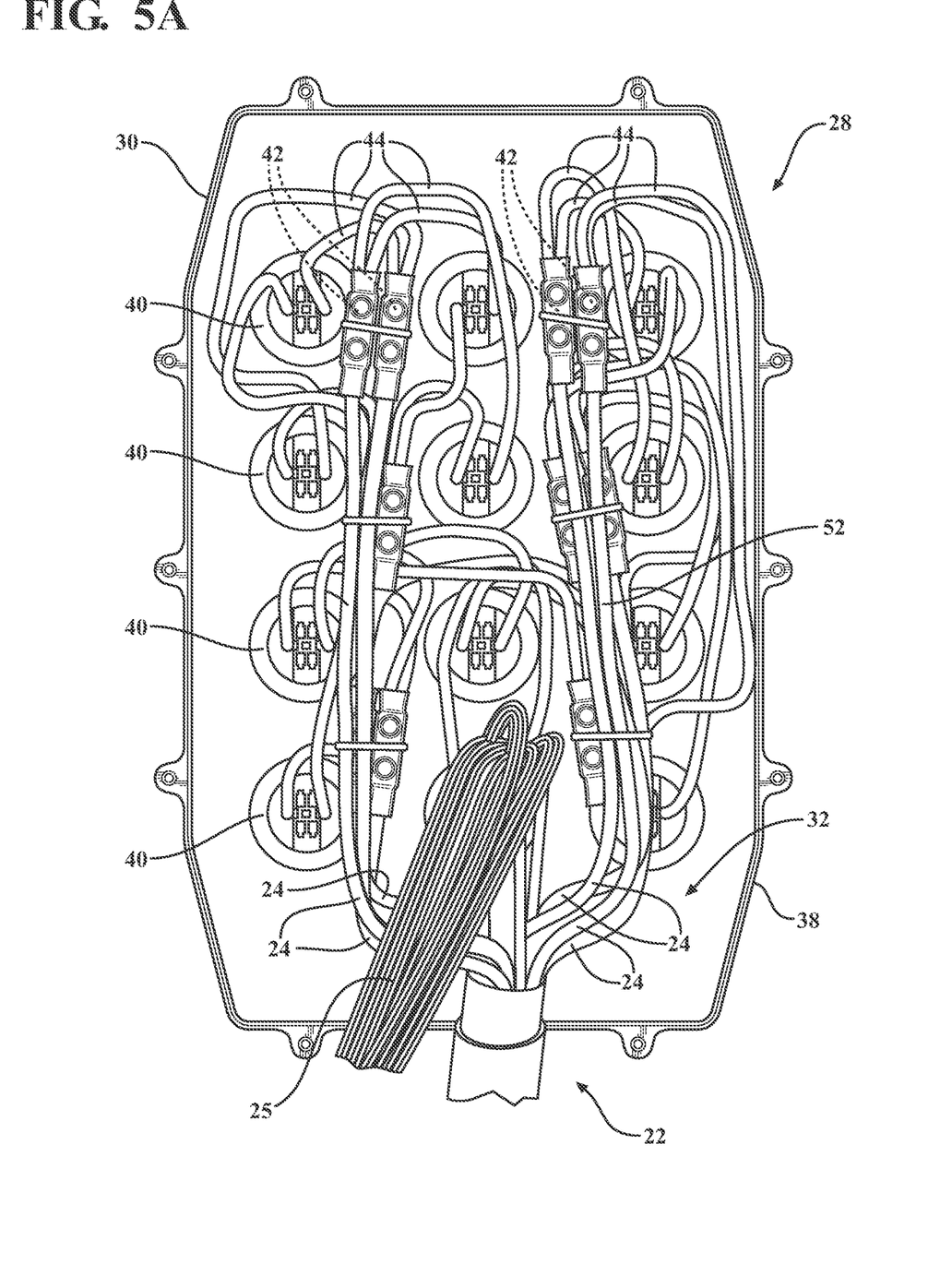
FIG. 5A is a front elevational view of the telecommunication system with the body removed and showing the power cables coupled to the splitters.

The remote radio units may be disposed high on the tower near the antennas (especially common in fourth generation (4G) wireless communication systems). The telecommunication system 20 includes a trunk cable assembly 22. The trunk cable assembly 22 may be configured to be coupled to the remote radio units to connect the remote radio units to the telecommunication network. As shown in FIGS. 1, 4, and 5A, the trunk cable assembly 22 includes a plurality of power cables 24 and a plurality of communication cables 25. The plurality of communication cables 25 may be configured as optical fibers or any other suitable material for transmitting data therethrough. In one embodiment, the cell tower includes a plurality of remote radio units. As such, the trunk cable assembly 22 may extend from the base station on the ground to the equipment levels or tiers disposed a hundred or more feet up the tower. The power cables 24 and the communication cables 25 may be utilized within jacketed hybrid cable constructions. Alternatively, the power cables 24 and the communication cables 25 may be enclosed within a conduit extending up the tower. In either embodiment, the trunk cable assembly 22 is commonly referred to in the art as a vertical trunk cable.

Regardless of the type of trunk cable assembly 22 used up the tower, the point where the power cable(s) 24 leave the jacket/conduit and terminate at the terminal end needs to be environmentally protected. Accordingly, the telecommunication system 20 further includes a cable distribution assembly 28.

Figure 2:
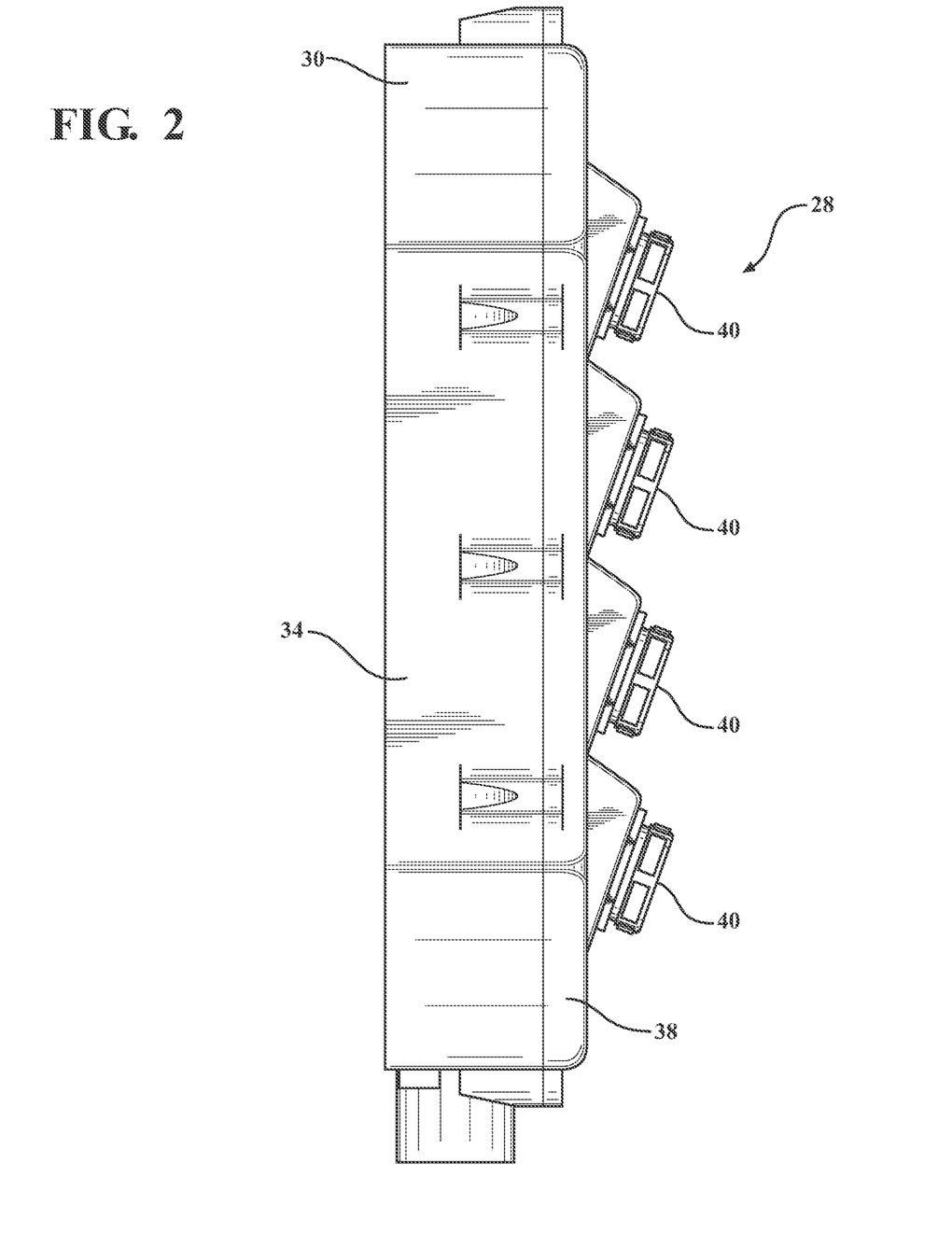
FIG. 2 is a side elevational view of the cable distribution assembly, including a housing having a body and a cover.
Figure 3:
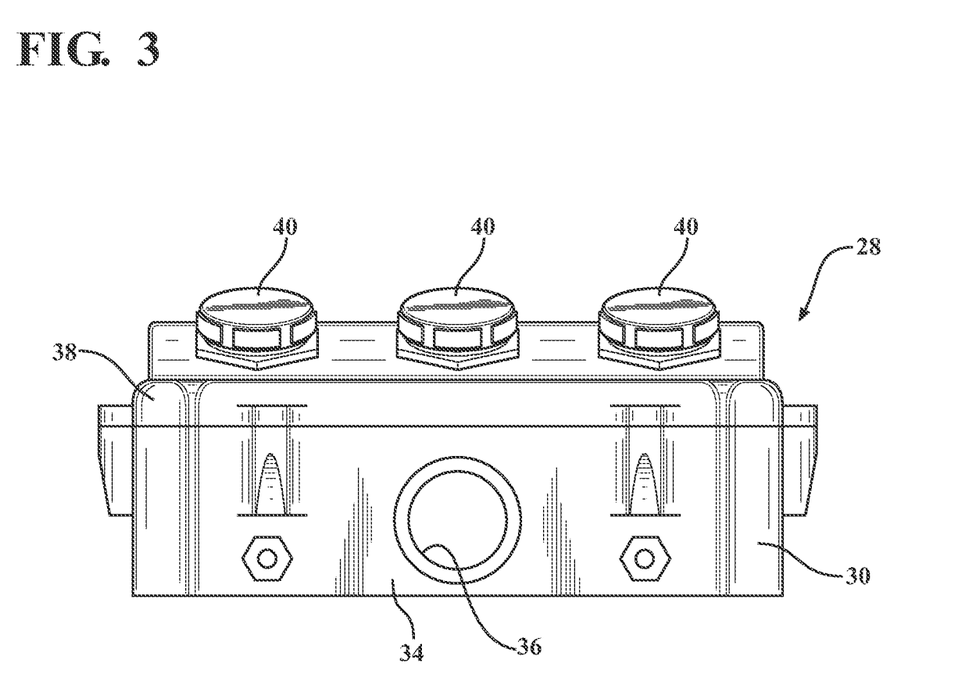
FIG. 3 is a bottom elevational view of the cable distribution assembly.

As shown in FIGS. 1-3, the cable distribution assembly 28 includes a housing 30. The housing 30 defines an interior 32, shown in FIGS. 4-7. The housing 30 includes a body 34 defining a opening 36 opening into the interior 32, as shown in FIG. 3. The opening 36 is configured to receive the power cable 24 therethrough and dispose one of the pair of terminal ends 26 of the power cable 24 in the interior 32. As shown in FIGS. 2 and 3, the housing 30 further includes a cover 38 selectively mounted to the body 34 and configured to provide access to the interior 32. The cover 38 includes at least two connectors 40 configured for selective coupling to telecommunication devices (e.g., the remote radio unit).

As shown in FIGS. 4-7, the cable distribution assembly 28 further includes a splitter 42 coupled to the cover 38. More specifically, the splitter 42 may be disposed within the interior 32. The cable distribution assembly 28 further includes at least two distribution cables 44 each extending between a first end 46 and a second end 48. Each of the first ends 46 of the distribution cables 44 are coupled to the splitter 42 and each of the second ends 48 of the distribution cables 44 individually correspond to, and are connected to, one of said at least two connectors 40.

The splitter 42, the at least two distribution cables 44, and the at least two connectors 40 are continuously coupled to the cover 38 of the housing 30 when mounted to and removed from the body 34 of the housing 30. The trunk cable assembly 22 is mounted to the opening 36 and extends into the interior 32 of the housing 30. The plurality of power cables 24 each extend to a terminal end 26, with one of the power cables 24 connected to the splitter 42 at the terminal end 26 for providing electricity from the power cable 24 to the connectors 40 and further to the telecommunication devices selectively coupled to the connectors 40. At least two of the communication cables 25 are directly connected to each of the connectors 40.

Figure 6:
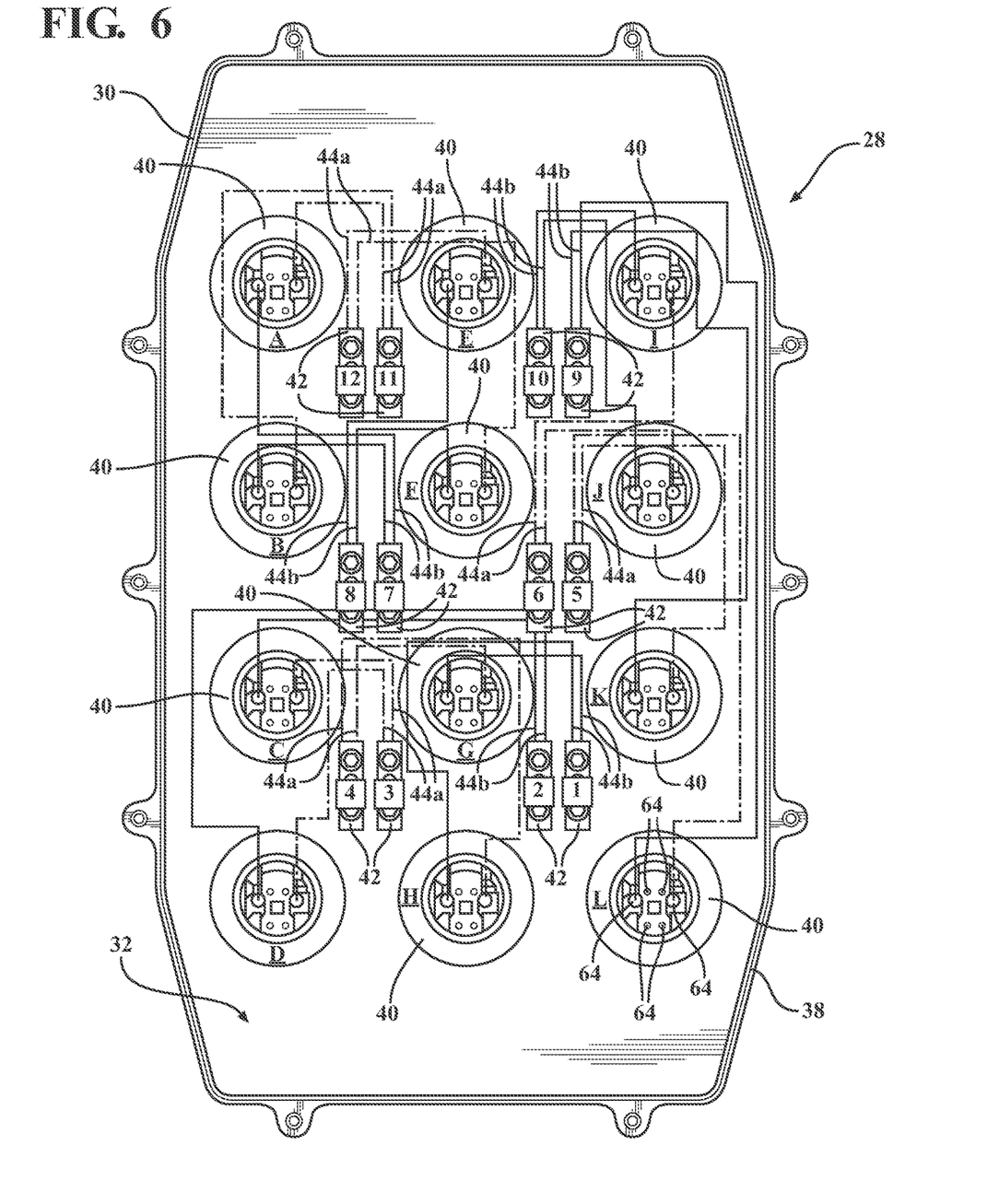
FIG. 6 is a schematic front plan view of the cable distribution assembly with the body removed.
Figure 7:
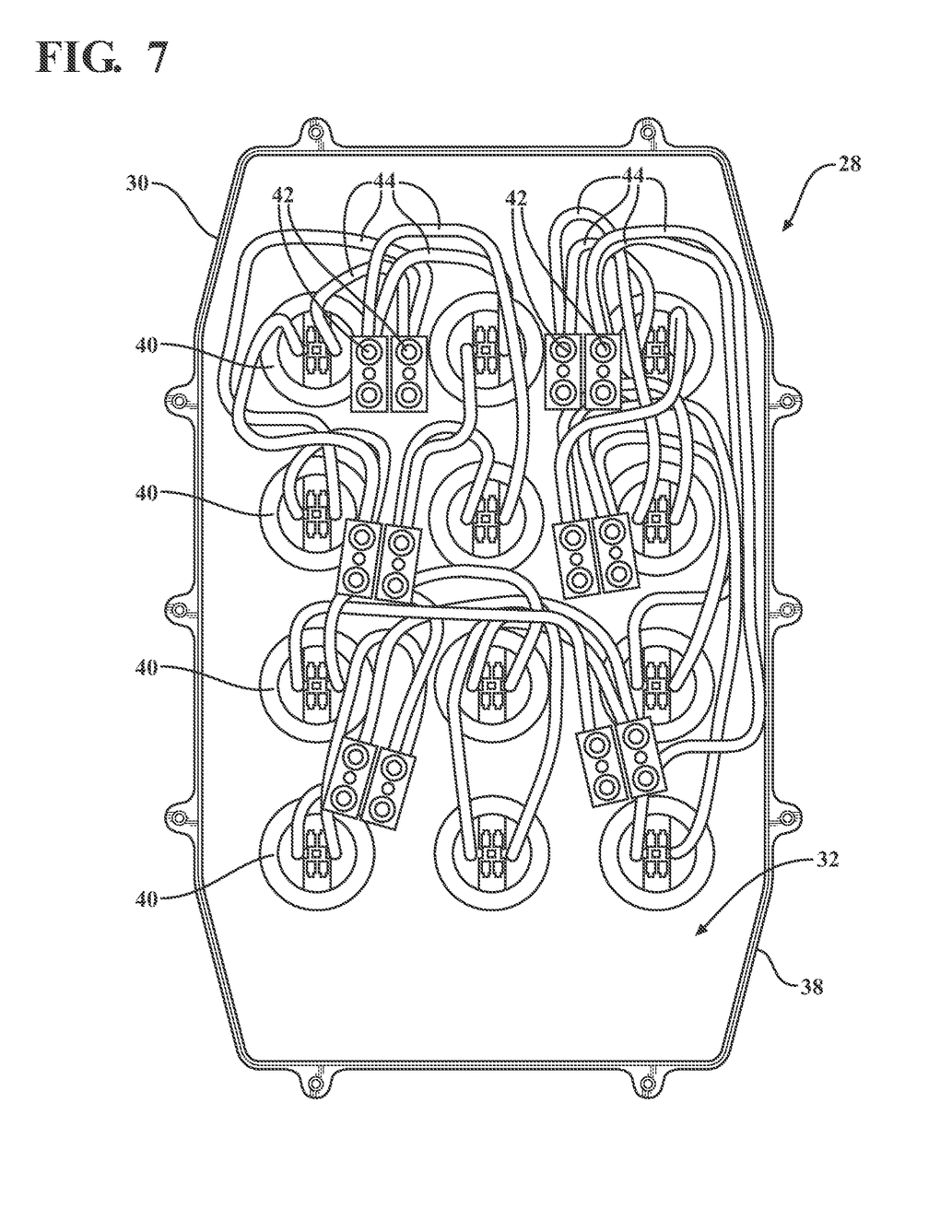
FIG. 7 is a front elevational view of the cable distribution assembly with the body removed.

Accordingly, the telecommunication system 20 provides the advantage of coupling all components between the power cable 24 and the connectors 40 to the cover 38. As mentioned above, the splitter 42, the at least two distribution cables 44, and the at least two connectors 40 are continuously coupled to the cover 38 of the housing 30 when mounted to and removed from the body 34 of the housing 30. Furthermore, the splitter 42, the at least two distribution cables 44, and the at least two connectors 40 are not coupled to the body 34 of the housing 30 when the cover 38 is spaced from the body 34. Said differently, the components between the splitter 42 and the connectors 40 are not coupled to the body 34 of the housing 30. Therefore, removal of the cover 38 pulls all of the components out of the interior 32 of the housing 30, which improves access to all of the components. The plurality of power cables 24 and the plurality of communication cables 25 are disconnectable from the cover 38 such that the splitter 42, the at least two distribution cables 44, and the at least two connectors 40 remain coupled to the cover 38 when the cover 38 is removed from the body 34. Said differently, because none of the components are coupled to the body 34, the cover 38 and all components between the splitter 42 and the connectors 40 may be completely separated from the body 34 of the housing 30 when the power cable 24 is disconnected from the splitter 42, as shown in FIGS. 6 and 7.

Figures 8, 9, 10:
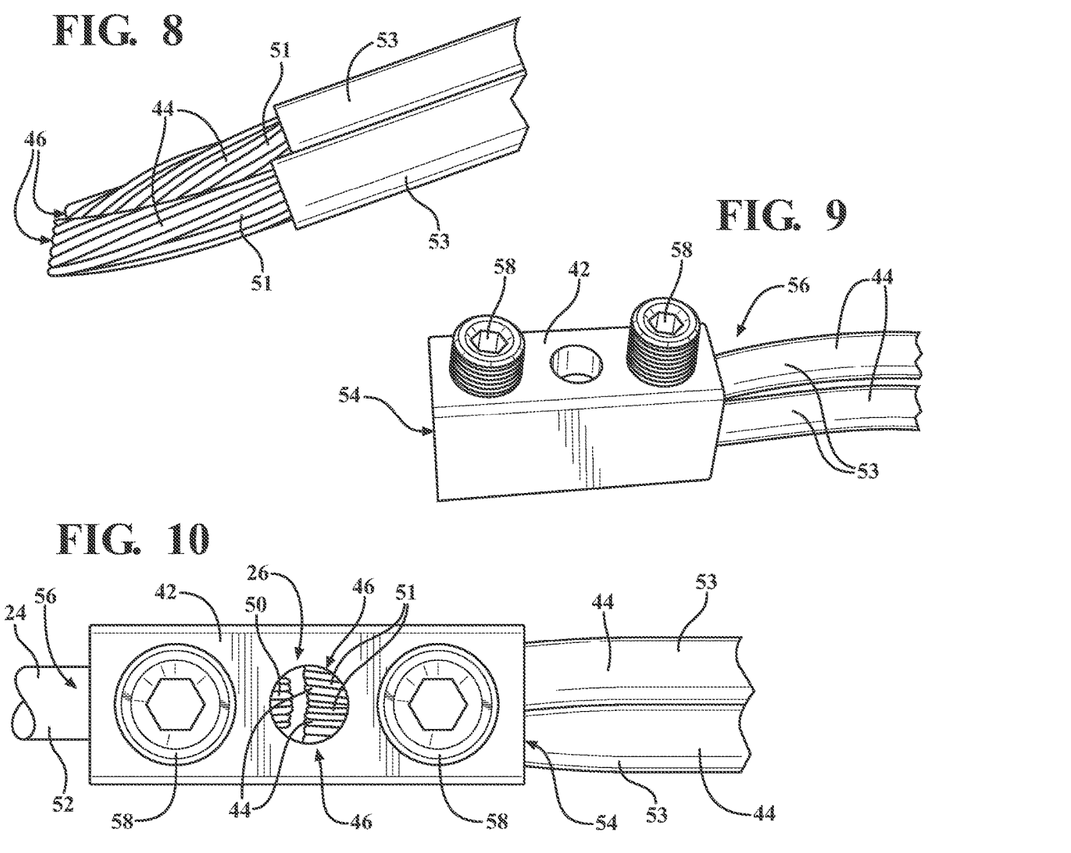
FIG. 8 is a perspective view of first ends of a pair of distribution cables.
FIG. 9 is a perspective view of a splitter coupled with the first ends of the pair of distribution cables.
FIG. 10 is a top elevational view of the splitter coupled to the first ends of the pair of distribution cables and the power cable.

Each of the power cable 24 and the at least two distribution cables 44 are configured to transmit an electric current therethrough, with each of the power cable 24 and the at least two distribution cables 44 including a conductive core 50, 51 (typically comprising copper) and an insulator 52, 53 (typically an elastomer) enveloping the core 50, 51, as shown in FIG. 10. However, the electrically powered wire may be comprised of any material in any configuration for transmitting an electric current.

Figure 11:
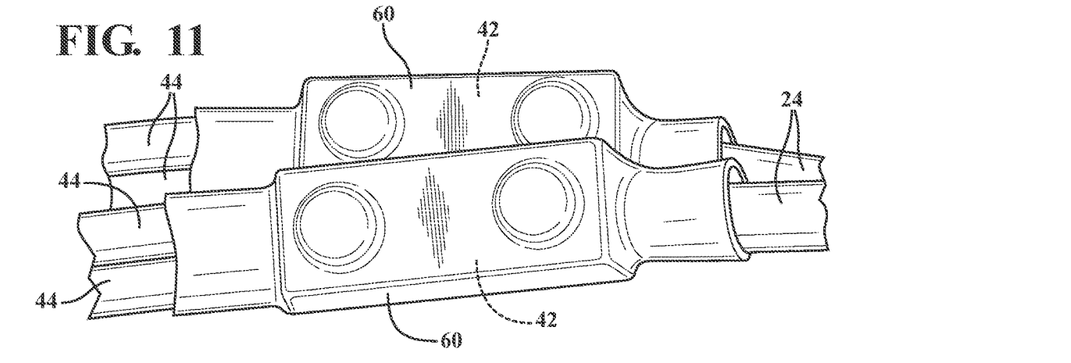
FIG. 11 is a perspective view of the splitter covered with a shrink-wrap.

The terminal end 26 may be disposed in the interior 32 of the housing 30 may be stripped to expose the conductive core 50, as shown in FIG. 10. The splitter 42 may comprise a conductive material for transmitting the electric current between the power cable 24 and the at least two distribution cables 44. The splitter 42 may include an input terminal 54 configured to receive the terminal end 26 of the power cable 24 and an output terminal 56 configured to receive the first end 46 of both of each of the at least two distribution cables 44. The first ends 46 of the distribution cables 44 may be stripped to expose the conductive core 51 (as shown in FIG. 8), with the conductive core 51 disposed in the splitter 42 (as shown in FIG. 9). The splitter 42 may include a pair of threaded studs 58 configured to squeeze and fasten the cables 24, 44 to the splitter 42 when tightened. More specifically, one of the threaded studs 58 fastens the terminal end 26 of the power cable 24 to the splitter 42 and the other one of the threaded studs 58 fastens the first ends 46 of the distribution cables 44 to the splitter 42. As shown in FIG. 11, the telecommunication system 20 may further include a shrink-wrap 60 enveloping the splitter 42 to prevent an electrical short. One having skill in the art will appreciate that the splitter 42 may be comprised of any material in any configuration that facilitates coupling between the power cable 24 and the distribution cables 44.

Figure 12:
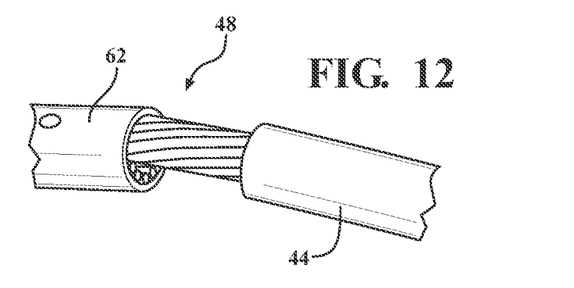
FIG. 12 is a perspective view of a second end of the distribution cable partially disposed in a terminal.
Figure 13:
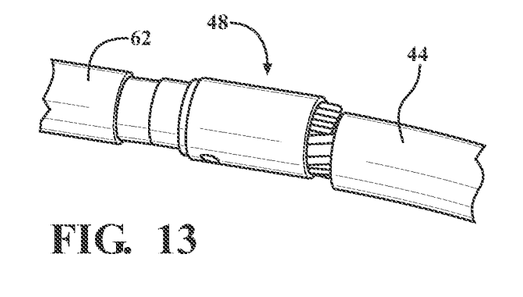
FIG. 13 is a perspective view of the second end of the distribution cable disposed in the terminal.
Figure 15:
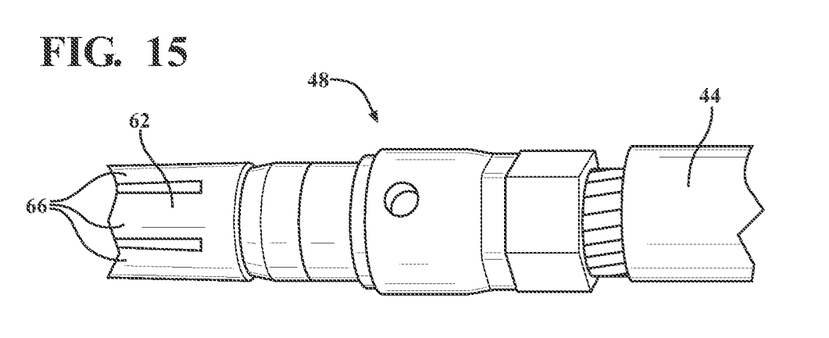
FIG. 15 is a side elevational view of the second end of the distribution cable disposed in the terminal, with the terminal crimped to the distribution cable.

The second ends 48 of the distribution cables 44 may be stripped to expose the conductive core 51, as shown in FIGS. 12 and 13. The cable distribution assembly 28 may further include a terminal 62 disposed on, and fastened to, the second ends 48 of each of the at least two distribution cables 44. The terminal 62 may be fastened to the second end 48 by crimping, as shown in FIG. 15. However, the terminal 62 may be fastened to the second end 48 in any other suitable manner, including soldering, press fitting, gluing, etc.

Figure 14:
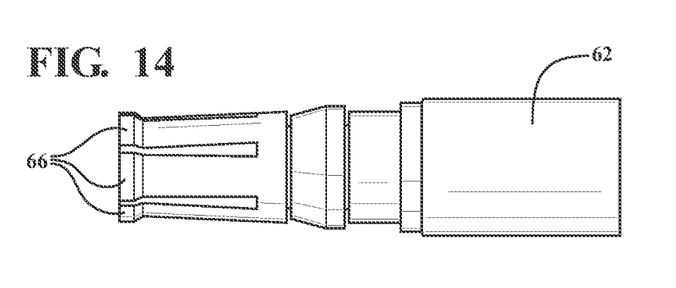
FIG. 14 is a side elevational view of the terminal.
Figure 16:
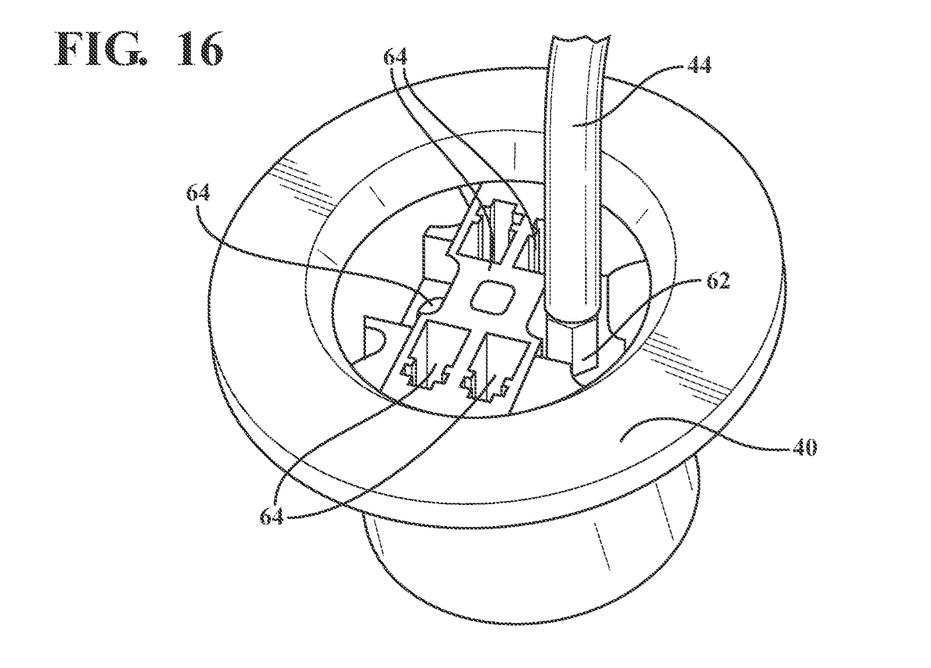
FIG. 16 is a perspective view of the distribution cable disposed in a port of one of the connectors.
Figure 17:
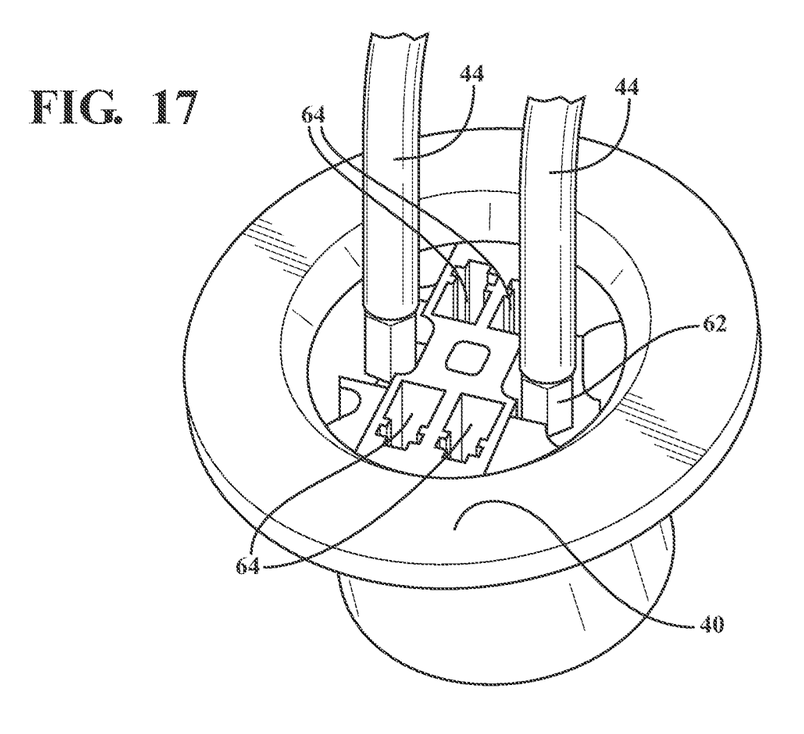
FIG. 17 is a perspective view of a pair of distribution cables disposed in a pair of ports of the connector.

Each of the connectors 40 may be configured to receive the terminal(s) 62. As shown in FIGS. 16 and 17, each of the connectors 40 include at least one port 64 configured to receive the terminal 62. The port 64 and the corresponding terminal 62 have opposite configurations to ensure contact between the terminal 62 and the connector 40 within the port 64. The terminal 62 may have a substantially cylindrical configuration and the port 64 may have a void having a similarly sized cylindrical configuration for receiving the terminal 62. Moreover, the terminal 62 may have a plurality of segments 66 biased outwardly toward the connector 40 when disposed in the port 64 to facilitate a snap-fit connection between the terminal 62 and the connector 40 to prevent inadvertent removal of the terminal 62 from the port 64, as shown in FIGS. 14 and 15. The snug engagement between the terminal 62 and the port 64 facilitates transmission of electricity, an optical signal, or any other suitable transmission between the distribution cable 44 and the connector 40. One having skill in the art will appreciate that in other embodiments, the second end 48 of the distribution cable 44 may be directly inserted into the connector 40. Moreover, the second end 48 of the distribution cable 44 may be coupled to the connector 40 in any suitable manner.

As described above, the power cable 24 is configured as an electrically powered wire. As such, the coupling of the power cable 24 with the splitter 42, the splitter 42 with the distribution cables 44, and the distribution cables 44 with the connectors 40 facilitates the transmission of electricity between the power cable 24 and the connectors 40. More specifically, the power cable 24, the splitter 42, and the at least two distribution cables 44 may have the same polarity to facilitate the transmission of the electric current between the power cable 24 and the at least two connectors 40. Moreover, the power cable 24, the splitter 42, and the at least two distribution cables 44 may be further defined as a positive power cable 24*a*, a positive splitter 42*a*, and at least two positive distribution cables 44*a*. The telecommunication system 20 may further include a negative power cable 24*b*, a negative splitter 42*b*, and at least two negative distribution cables 44*b* coupled to the at least two connectors 40 and having a polarity opposite that of the positive power cable 24*a*, the positive splitter 42*a*, and the at least two positive distribution cables 44*a* to facilitate a complete electrical circuit through each of the at least two connectors 40.

Figure 5B:
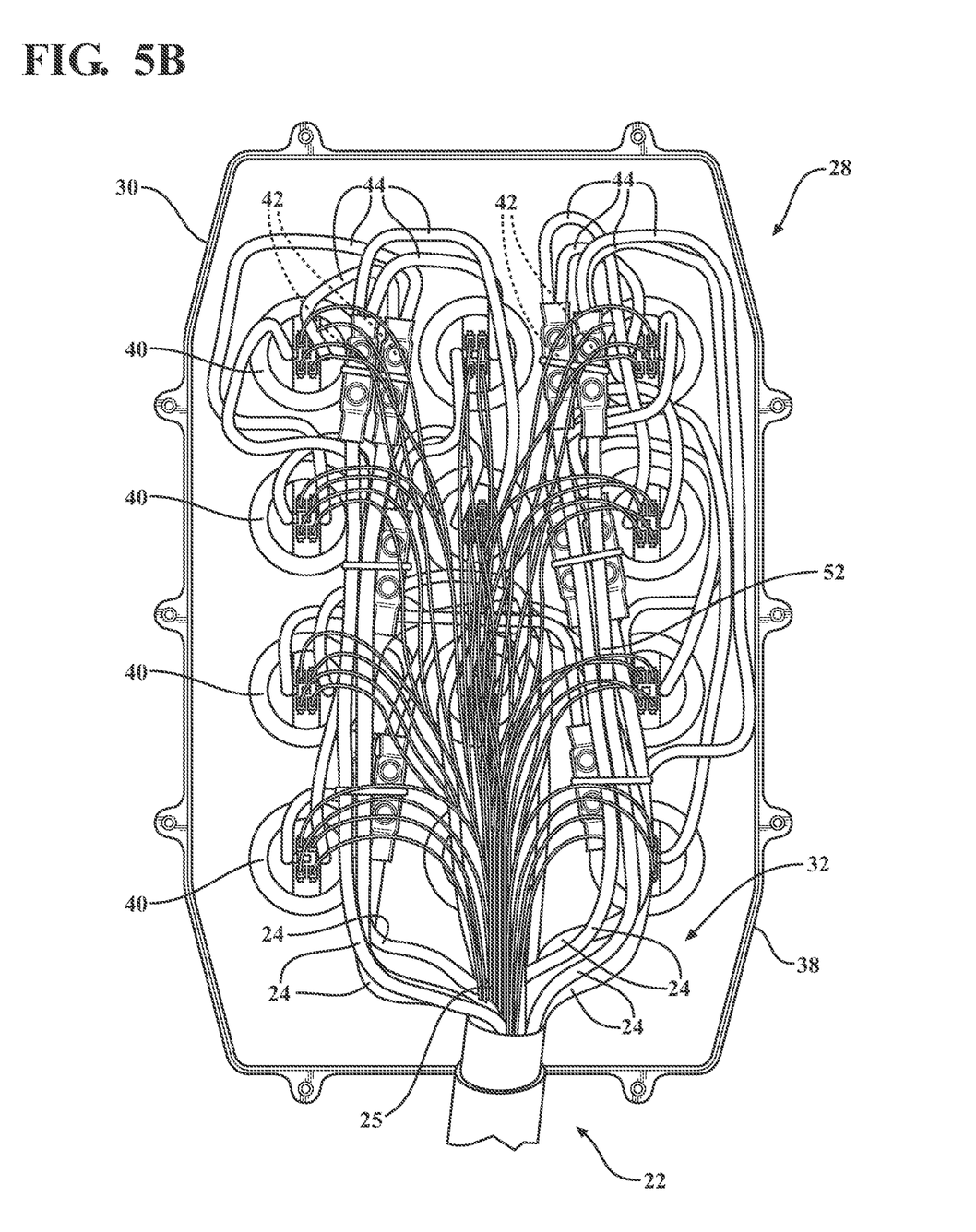
FIG. 5B is a front elevational view of the telecommunication system with the body removed and showing communication cables connected to a plurality of connectors.

As shown in FIGS. 16 and 17, the at least one port 64 may be further defined as a plurality of ports 64. As such, each of the connectors 40 include at least two ports 64, with one of the two ports 64 configured to receive one of the at least two positive distribution cables 44*a* and with the other one of the two ports 64 configured to receive one of the at least two negative distribution cables 44*b* to facilitate a complete electrical circuit through each of the at least two connectors 40. More specifically, in the embodiment shown in the figures, the plurality of ports 64 comprises six ports 64. Two of the six ports 64 may have the aforementioned cylindrical configuration. Four of the six ports 64 have a substantially cuboidal configuration. In this embodiment, the two ports 64 having the substantially cylindrical configuration are configured to be operably coupled to the power cables 24 that are the electrically powered wires, as described above. The four ports 64 having the substantially cuboidal configuration are operably coupled to the communication cables 25, as shown in FIG. 5B. However, the connector 40 may have any number of ports 64 having any suitable configurations for being operably coupled to any power cable 24.

As described above, each of the second ends 48 of the distribution cables 44 individually correspond to, and are coupled with, the connectors 40. As shown in FIGS. 6 and 7, two distribution cables 44 extend from the splitter 42 and are coupled to two connectors 40. More specifically, the second end 48 of one of the distribution cables 44 is coupled to one of the connectors 40 and the second end 48 of the other one of the distributions cables is coupled to the other one of the connectors 40. In the embodiment shown in FIG. 6, one of the distribution cables 44 is coupled to one of the two ports 64 having the cylindrical configuration of one of the at least two connectors 40. The other one of the distribution cables 44 is coupled to one of the two ports 64 having the cylindrical configuration of one of the at least two connectors 40. In this embodiment, another power cable 24 is coupled to another splitter 42 that in-turn is coupled to two additional distribution cables 44, in accordance with the description above. The two additional distribution cables 44 are individually coupled to the other one of the two ports 64 of each of the at least two connectors 40. In this embodiment, a circuit is completed within each connector 40 between the two ports 64 when the telecommunication device is coupled to the connector 40. As such, one of the aforementioned power cables 24 is a positive electrically powered wire and the other one of the power cables 24 is a negative electrically powered wire.

In the embodiment shown in FIGS. 4-7, each of the connectors 40 include the four ports 64 having the substantially cuboidal configuration. As described above, the four ports 64 having the substantially cuboidal configuration are coupled with the communication cables 25. More specifically, the communication cables 25 are individually coupled to the corresponding ports 64. Said differently, the communication cables 25 are not coupled to a splitter disposed in the housing 30. However, as discussed above, one having skill in the art will appreciate that the communication cables 25 may be coupled to a splitter in alternative embodiments to evenly distribute a signal to two or more connectors 40.

The description above refers to the cable distribution assembly 28 comprising at least two connectors 40. However, the at least two connectors 40 may be further defined as a plurality of connectors 40, greater than two. In the embodiment shown in FIGS. 1 and 4-6, the plurality of connectors 40 is specifically twelve connectors 40. The description above has addressed the use of two connectors 40 in conjunction with one of the plurality of power cables 24 being coupled to the two connectors 40 through one splitter 42 and two distribution cables 44. However, the number of connectors 40 may be at least twice as many as the number of power cables 24. The plurality of power cables 24 may configured to be coupled with the plurality of connectors 40. Moreover, the at least two distribution cables 44 may be further defined as a plurality of distribution cables 44, with the number of distribution cables 44 at least twice as many as the number of power cables 24. In the exemplary embodiment shown in the Figures, the number of distribution cables 44 are exactly twice as many as the number of power cables 24.

In the exemplary embodiment shown in FIG. 6, twelve splitters 42 are shown and labeled 1-12. Furthermore, twelve connectors 40 are shown and labeled A-L. The matrix below lists the exemplary coupling between respective splitters 42 and connectors 40 (via a single distribution cable 44 between each splitter 42 and connector 40). Moreover, the polarity of the electricity passing through the splitters 42 and connectors 40 is also listed. One having skill in the art will appreciate that the splitters 42 and the connectors 40 may be coupled in any suitable arrangement.

| Splitter | Connectors | Polarity of Distribution Cables |
| --- | --- | --- |
| 1 | G and H | Negative |
| 2 | C and D | Negative |
| 3 | C and D | Positive |
| 4 | G and H | Positive |
| 5 | K and L | Positive |
| 6 | I and J | Positive |
| 7 | A and B | Negative |
| 8 | E and F | Negative |
| 9 | K and L | Negative |
| 10 | I and J | Negative |
| 11 | A and B | Positive |
| 12 | E and F | Positive |

Although not shown in the figures, one power cable 24 may be coupled to more than two connectors 40 through more than two distribution cables 44 coupled to the corresponding splitter 42.

The invention has been described in an illustrative manner, and it is to be understood that the terminology which has been used is intended to be in the nature of words of description rather than of limitation. As is now apparent to those skilled in the art, many modifications and variations of the subject invention are possible in light of the above teachings. It is, therefore, to be understood that within the scope of the appended claims, wherein reference numerals are merely for convenience and are not to be in any way limiting, the invention may be practiced otherwise than as specifically described.

What is claimed is:

1. A telecommunication system for powering and distributing a signal within a telecommunication network, said system comprising:
   a cable distribution assembly comprising:
      a housing defining an interior and comprising:
         a body defining an opening into said interior; and
         a cover selectively mounted to said body and configured to provide access to said interior with said cover comprising at least two connectors configured for selective coupling to telecommunication devices;
      a splitter coupled to said cover; and
      at least two distribution cables each extending between a first end and a second end, with each of said first ends of said distribution cables coupled to said splitter and each of said second ends of said distribution cables individually corresponding to, and connected to, one of said at least two connectors;
      wherein said splitter, said at least two distribution cables, and said at least two connectors are continuously coupled to said cover of said housing when mounted to and removed from said body of said housing; and
   a trunk cable assembly mounted to said opening and extending into said interior of said housing, said trunk cable assembly comprising:
      a plurality of power cables each extending to a terminal end, with one of said power cables connected to said splitter at said terminal end for providing electricity from said power cable to said connectors and further to the telecommunication devices selectively coupled to said connectors; and
      a plurality of communication cables with at least two of the communication cables directly connected to each of said connectors;
      wherein said plurality of power cables and said plurality of communication cables are disconnectable from said cover such that said splitter, said at least two distribution cables, and said at least two connectors remain coupled to said cover when said cover is removed from said body.

2. The telecommunication system as set forth in claim 1, wherein said at least two connectors is further defined as a plurality of connectors, greater than two.

3. The telecommunication system as set forth in claim 2, wherein the number of connectors is at least twice as many as the number of power cables.

4. The telecommunication system as set forth in claim 1, wherein each of said power cable and said at least two distribution cables are configured to transmit an electric current therethrough, with each of said power cable and said at least two distribution cables comprising a conductive core and an insulator enveloping said core.

5. The telecommunication system as set forth in claim 4, wherein said splitter comprises a conductive material for transmitting the electric current between said power cable and said at least two distribution cables.

6. The telecommunication system as set forth in claim 5, wherein said power cable, said splitter, and said at least two distribution cables have the same polarity to facilitate the transmission of the electric current between said power cable and said at least two connectors.

7. The telecommunication system as set forth in claim 6, wherein said power cable, said splitter, and said at least two distribution cables are further defined as a positive power cable, a positive splitter, and at least two positive distribution cables, and further comprising a negative power cable, a negative splitter, and at least two negative distribution cables coupled to said at least two connectors and having a polarity opposite that of said positive power cable, said positive splitter, and said at least two positive distribution cables to facilitate a complete electrical circuit through each of said at least two connectors.

8. The telecommunication system as set forth in claim 7, wherein each of said connectors comprise at least two ports, with one of said two ports configured to receive one of said at least two positive distribution cables and with said other one of said two ports configured to receive one of said at least two negative distribution cables to facilitate a complete electrical circuit through each of said at least two connectors.

9. The telecommunication system as set forth in claim 5, further comprising a shrink-wrap enveloping said splitter to prevent an electrical short.

10. The telecommunication system as set forth in claim 1, wherein said splitter comprises an input terminal configured to receive said terminal end of said power cable and an output terminal configured to receive said first end of both of each of said at least two distribution cables, and further comprising a pair of threaded studs configured to squeeze and fasten said cables to said splitter when tightened, with one of said threaded studs configured to fasten said terminal end of said power cable to said splitter and the other one of said threaded studs configured to fasten said first ends of said distribution cables to said splitter.

11. The telecommunication system as set forth in claim 1, wherein said cable distribution assembly further comprises a terminal disposed on, and fastened to, said second end of each of said at least two distribution cables.

12. The telecommunication system as set forth in claim 11, wherein said terminal is fastened to said second end by crimping.

13. The telecommunication system as set forth in claim 11, wherein each of said connectors comprise at least one port configured to receive said terminal, with said port and said corresponding terminal having opposite configurations to ensure contact between said terminal and said connector within said port.

14. The telecommunication system as set forth in claim 13, wherein said terminal has a substantially cylindrical configuration and said port has a void having a similarly sized cylindrical configuration for receiving said terminal.

15. The telecommunication system as set forth in claim 13, wherein said terminal has a plurality of segments biased outwardly toward said connector when disposed in said port to facilitate a snap-fit connection between said terminal and said connector to prevent inadvertent removal of said terminal from said port.

16. A cable distribution assembly for use with a trunk cable assembly comprising a plurality of power cables each extending to a terminal end and a plurality of communication cables, said cable distribution assembly comprising:
a housing defining an interior and comprising:
a body defining an opening into said interior; and
a cover selectively mounted to said body and configured to provide access to said interior with said cover comprising at least two connectors configured for selective coupling to telecommunication devices;
a splitter coupled to said cover;
at least two distribution cables each extending between a first end and a second end, with each of said first ends of said distribution cables coupled to said splitter and each of said second ends of said distribution cables individually corresponding to, and connected to, one of said at least two connectors;
wherein said splitter, said at least two distribution cables, and said at least two connectors are continuously coupled to said cover of said housing when mounted to and removed from said body of said housing; and
a terminal disposed on, and fastened to, said second end of each of said at least two distribution cables;
wherein said terminal is fastened to said second end by crimping.

17. The telecommunication system as set forth in claim 16, wherein the number of connectors is at least twice as many as the number of power cables.

18. The telecommunication system as set forth in claim 16, wherein each of said connectors comprise at least one port configured to receive said terminal, with said port and said corresponding terminal having opposite configurations to ensure contact between said terminal and said connector within said port.

19. A telecommunication system for powering and distributing a signal within a telecommunication network, said system comprising:
a cable distribution assembly comprising:
a housing defining an interior and comprising:
a body defining an opening into said interior; and
a cover selectively mounted to said body and configured to provide access to said interior with said cover comprising at least two connectors configured for selective coupling to telecommunication devices;
a splitter coupled to said cover; and
at least two distribution cables each extending between a first end and a second end, with each of said first ends of said distribution cables coupled to said splitter and each of said second ends of said distribution cables individually corresponding to, and connected to, one of said at least two connectors;
wherein said splitter, said at least two distribution cables, and said at least two connectors are continuously coupled to said cover of said housing when mounted to and removed from said body of said housing; and
a trunk cable assembly mounted to said opening and extending into said interior of said housing, said trunk cable assembly comprising:
a plurality of power cables each extending to a terminal end, with one of said power cables connected to said splitter at said terminal end for providing electricity from said power cable to said connectors and further to the telecommunication devices selectively coupled to said connectors; and
a plurality of communication cables with at least two of the communication cables directly connected to each of said connectors;
wherein said at least two distribution cables are further defined as a plurality of distribution cables, with the number of distribution cables at least twice as many as the number of power cables.

20. The telecommunication system as set forth in claim 19, wherein the number of distribution cables are exactly twice as many as the number of power cables.

21. The telecommunication system as set forth in claim 20, wherein said plurality of power cables and said plurality of communication cables are disconnectable from said cover such that said splitter, said at least two distribution cables, and said at least two connectors remain coupled to said cover when said cover is removed from said body.

* * * * *